R. J. BURROWS & E. B. ROSS.
WHEEL.
APPLICATION FILED JAN. 2, 1915.
1,265,741.
Patented May 14, 1918.
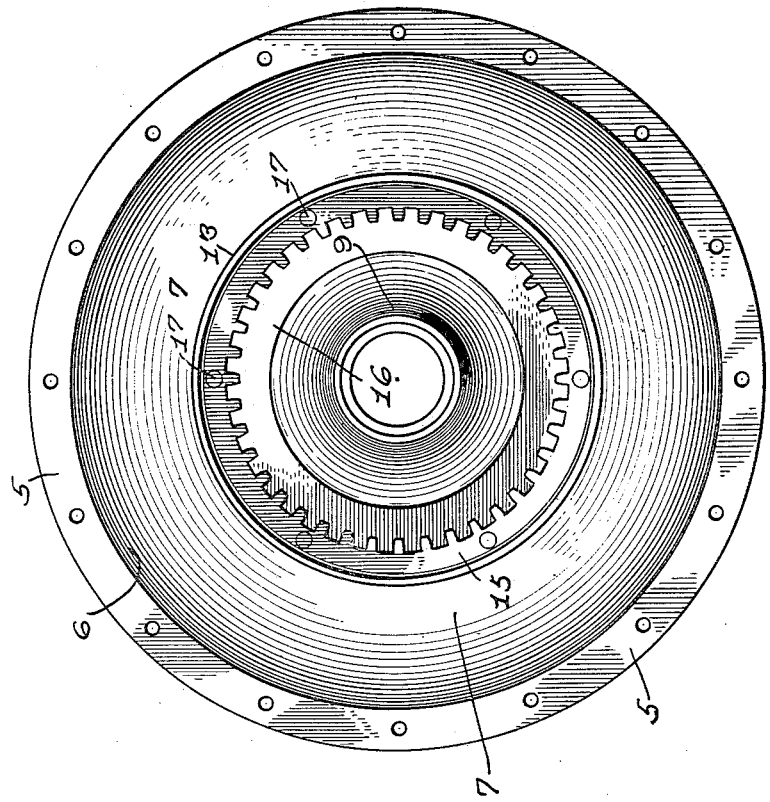
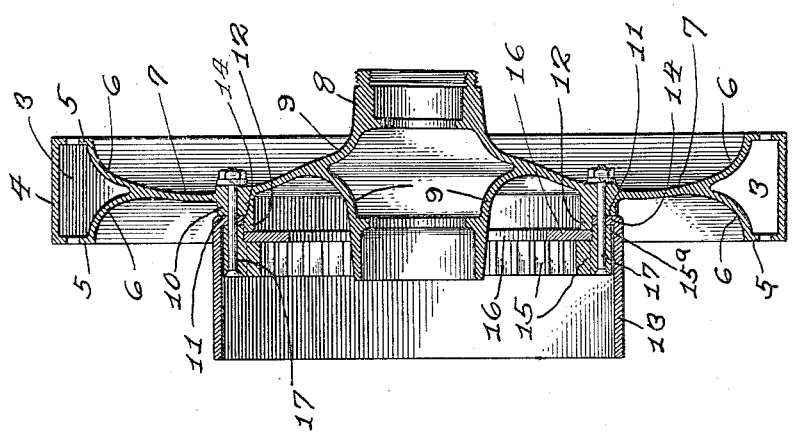
WITNESSES:
L. B. Graham
W. A. Furnner.
INVENTORS
Robert J. Burrows.
Edwin B. Ross,
BY Adams & Jackson,
ATTYS.

UNITED STATES PATENT OFFICE.

ROBERT J. BURROWS AND EDWIN B. ROSS, OF BUCHANAN, MICHIGAN, ASSIGNORS, BY MESNE ASSIGNMENTS, TO CLARK EQUIPMENT COMPANY, OF BUCHANAN, MICHIGAN, A CORPORATION OF MICHIGAN.

WHEEL.

1,265,741.  Specification of Letters Patent.  Patented May 14, 1918.

Application filed January 2, 1915. Serial No. 201.

*To all whom it may concern:*

Be it known that we, ROBERT J. BURROWS and EDWIN B. ROSS, citizens of the United States, and residents of Buchanan, in the county of Berrien and State of Michigan, have invented certain new and useful Improvements in Wheels, of which the following is a specification, reference being had to the accompanying drawings.

Our invention relates to metal wheels designed especially for heavy use, such as on automobile trucks, and it has particularly to do with wheels of the general type shown and described in our application for patent filed of even date herewith, Serial No. 200. The invention which constitutes the subject-matter of the present application is a modification of the structure shown in our said application with regard to the manner in which the brake-drum and certain other parts are united therewith,—the object of our present invention being to provide a construction suitable for special situations in which it is desirable to make the brake-drum separate from the wheel proper, as, for instance, where a pressed steel drum is employed in connection with a cast wheel. We accomplish this object as illustrated in the drawings and as hereinafter described. That which we believe to be new is set forth in the claims.

In the accompanying drawings,—

Figure 1 is a side elevation of our improved wheel; and

Fig. 2 is a central vertical cross-section thereof.

Referring to the drawings,—

Our improved wheel comprises a box-like rim 3 composed of a substantially flat tread 4 adapted to receive a suitable tire and provided with substantially radial flanges 5 and oppositely-curved members 6 extending from the inner margins of said flanges to a web 7, which connects integrally with a hub 8 by oppositely-curved members 9. Thus far, the construction of our improved wheel is substantially like that shown in our said application. As best shown in Fig. 2, the web 7 is provided, preferably about midway of its length, with a circular enlargement 10, forming a seat or support the outer portion of which is turned down to form a shoulder 11 and a flange 12. The several parts of the wheel thus far described, including the enlargement 10, are all cast integral. 13 indicates the brake-drum, which is preferably made of pressed steel and is provided at its inner margin with an inturned flange 14 adapted to bear upon the shoulder 11 and against the outer face of the flange 12, as shown in Fig. 2. The shoulder 11 and the flange 12 thus together form an angular recess into which the inner margin of the brake-drum fits and is seated. 15 indicates a gear ring, which is of such diameter as to fit within the brake-drum 13 and is so shaped as to fit closely against the flange 14, against which it bears. To this end, the inner margin of the gear ring is provided with a flange 15$^a$. 16 indicates a flat ring fitted between the inner margin of the flange 14, to strengthen and further support the gear ring. 17 indicates bolts which pass through the gear ring, the flange 14, and the enlargement 10 of the web 7, for securing the gear ring, the brake-drum and the web firmly together.

By this construction it will be apparent that while the brake-drum and gear ring are firmly secured to the wheel, they may be readily removed and replaced when necessary.

Owing to the fact that the web 7 is sustained throughout by the truss-like rim-structure, which itself is capable of sustaining the entire load, and as the web forms a continuous connection between the rim and the hub and is elastically connected with the hub and with the rim-structure, the web may be made comparatively light, and by employing a pressed cast steel brake-drum, the structure of the wheel as a whole may be still further lightened without detracting from its strength and durability. The manner of securing the brake-drum to the web adds considerably to its strength, without, however, increasing its weight to an objectionable extent.

That which we claim as our invention, and desire to secure by Letters Patent, is,—

1. The combination with a wheel comprising a hub, a rim and a web connecting said hub and rim together, said web having an intermediate support, of a brake-drum having a flange at its inner margin adapted to bear against said support, a gear-ring adapted to fit within said brake-drum and bear against said flange, and means for securing said gear ring and said brake-drum to said web.

2. The combination with a wheel comprising a hub, a rim and a web connecting said hub and rim together, said web having an intermediate support, of a brake-drum having a flange at its inner margin adapted to bear against said support, a gear-ring adapted to fit within said brake-drum and bear against said flange, a ring fitting between said gear ring and said support, and means for securing said gear ring and said brake-drum to said web.

3. The combination with a wheel comprising a hub, a rim and a web connecting said hub and rim together, said web having an intermediate support, of a brake-drum having a flange at its inner margin adapted to bear against said support, a gear-ring adapted to fit within said brake-drum and bear against said flange, and bolts passing through said flange, gear-ring and web for securing the brake-drum and gear-ring to said web.

ROBERT J. BURROWS.
EDWIN B. ROSS.

Witnesses:
M. W. HAMLIN,
K. E. WEHRLY.